United States Patent
Loveridge et al.

[11] Patent Number: 5,982,941
[45] Date of Patent: Nov. 9, 1999

[54] METHOD OF PRODUCING DIGITAL IMAGE WITH IMPROVED PERFORMANCE CHARACTERISTIC

[75] Inventors: Jennifer C. Loveridge, North Harrow, United Kingdom; John A. Weldy, Rochester; Dale F. McIntyre, Honeoye Falls, both of N.Y.

[73] Assignee: Eastman Kodak Company, Rochester, N.Y.

[21] Appl. No.: 08/796,348

[22] Filed: Feb. 7, 1997

[51] Int. Cl.⁶ ................................................. G06K 9/32
[52] U.S. Cl. ........................... 382/260; 382/154; 382/284
[58] Field of Search ................................... 382/260–265, 382/284, 154

[56] References Cited

U.S. PATENT DOCUMENTS

| | | | |
|---|---|---|---|
| 2,921,509 | 2/1960 | Freund | 95/18 |
| 4,941,190 | 7/1990 | Joyce | 382/54 |
| 5,001,504 | 3/1991 | Okada | 354/118 |
| 5,187,754 | 2/1993 | Currin et al. | 382/54 |
| 5,424,792 | 6/1995 | Mikami | 354/120 |
| 5,477,291 | 12/1995 | Mikami et al. | 354/120 |
| 5,727,093 | 3/1998 | Uchiyama et al. | 382/294 |

FOREIGN PATENT DOCUMENTS 71995-336590  12/1995  Japan .

OTHER PUBLICATIONS

W.K. Pratt, Digital Image Processing, pp. 50–93, Wiley Interscience 1978.

D. Pearson, Chapter 3, "Motion and Motion Estimation," G. Thomas, pp. 40–57, McGraw–Hill, 1991.

*Primary Examiner*—Thomas D Lee
*Assistant Examiner*—Stephen Brinich
*Attorney, Agent, or Firm*—Raymond L. Owens

[57] ABSTRACT

A method of producing a digital image with improved performance characteristics including capturing at least two photographic film images of a scene and digitizing the at least two photographic film images of a scene. The method further includes combining and processing the at least two digitized photographic film images to produce another digital image with improved performance characteristics.

4 Claims, 4 Drawing Sheets

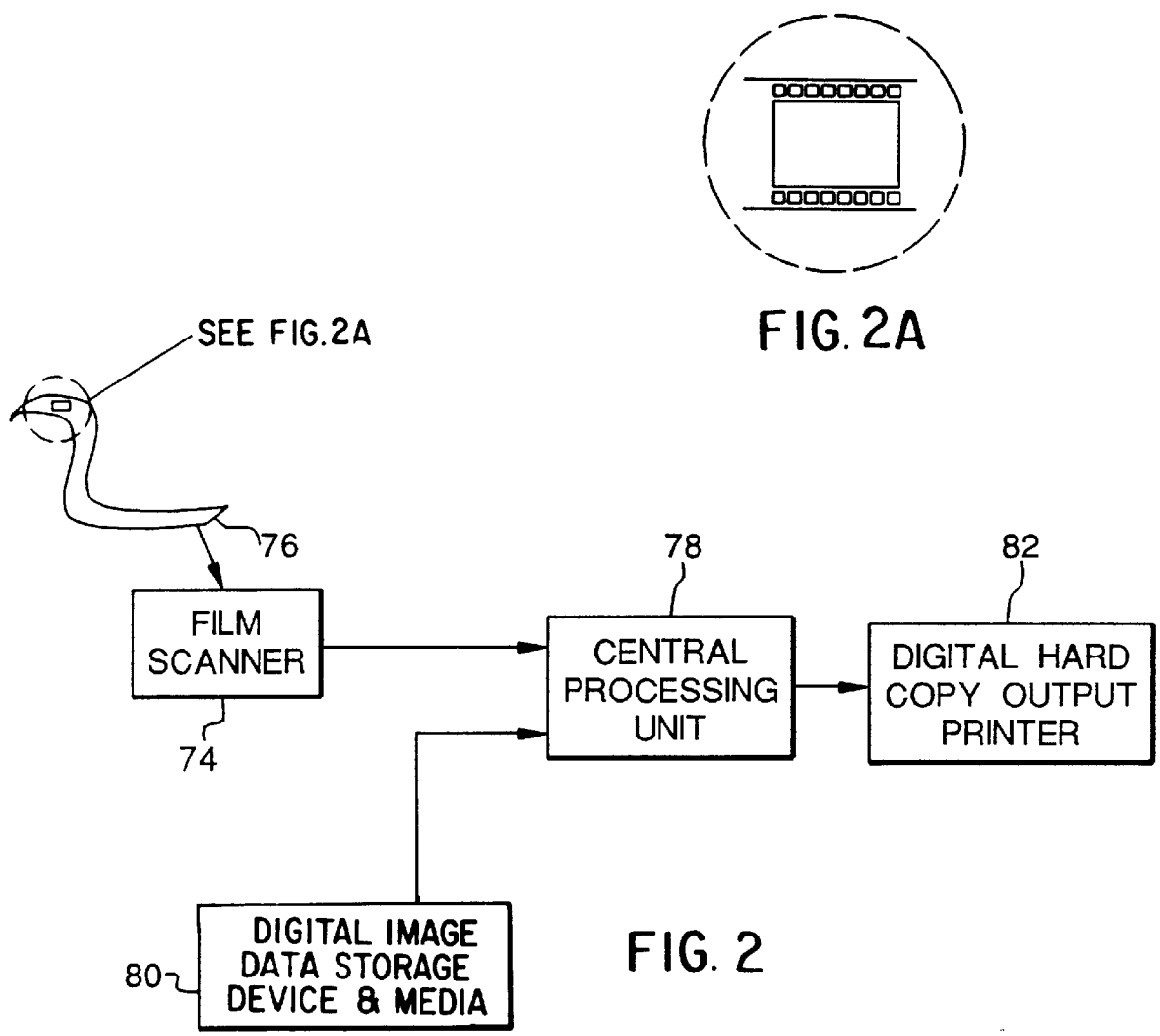

METHOD OF PRODUCING DIGITAL IMAGE WITH IMPROVED PERFORMANCE CHARACTERISTIC

CROSS REFERENCE TO RELATED APPLICATIONS

The present invention is related to U.S. patent application Ser. No. 08/672,390 filed May 29, 1996 to McIntyre et al entitled "A Camera for Recording Images on a Photographic Film or on a Magnetic Tape"; U.S. patent application Ser. No. 08/641,709 filed May 2, 1996 to K. R. Hailey et al entitled "Digital Signal Processing for Implementation of Continuous Zoom With Sub-Pixel Accuracy"; U.S. patent application Ser. No. 08/334,985, filed Nov. 7, 1994 to J. C. Loveridge entitled "Detection of Global Translations Between Images"; U.S. patent application Ser. No. 08/637,116, filed Apr. 24, 1996 to McIntyre et al entitled "A Non-Photographic Strip Having a Base Layer Similar to a Photographic Filmstrip and a Magnetic Recording Layer"; U.S. patent application Ser. No. 08/796,349, filed concurrently herewith to McIntyre et al entitled "Apparatus and Method of Producing Digital Image With Improved Performance Characteristic"; and U.S. patent application Ser. No. 08/796,350, filed concurrently herewith to Weldy et al entitled "Method of Producing Digital Images With Improved Performance Characteristic", assigned to the assignee of the present invention. The disclosure of these related applications is incorporated herein by reference.

FIELD OF THE INVENTION

The present invention relates to producing improved digital images which can be produced by a camera which captures multiple records of a scene.

BACKGROUND OF THE INVENTION

It is well known to use a camera with photographic film to capture a photographic record of a scene. Films can be designed to capture a black and white (B&W) record, capture a full color (separate red, green and blue light sensitive records), or capture a special purpose light sensitive record (such as XRAYS, infrared, etc.).

It is also well known that multiple records of the same scene can be captured on photographic film, or any other light sensitive image capturing media, and then subsequently combined to achieve improved performance characteristics. Early experiments with color photography were done with color separations. Examples of commercial applications of combining color separations include the technicolor motion picture process (described in The History of Movie Photography by Brian Coe, pp. 133). This process featured the simultaneous capture of multiple images, through a single lens pointing to the scene, to produce color separations. These color separations are formed by passing the light from this single lens through a subsequent image beam splitter that divides the light into separate red, green, and blue components. Advantages of this system are that a full color image can be recorded on non-color discriminating (such as B&W) film. Disadvantages are a bulky camera resulting from the addition of a beam splitter and numerous alignment problems that occur both during the capture step and in the subsequent combining and printing of the color separations required to produce a full color image for display.

Furthermore, it is also well known that multiple images can be captured through multiple lenses. A well known example of multiple images captured simultaneously through multiple lenses is stereo photography wherein a three dimensional representation of the scene can be rendered on display from at least two images purposefully taken from slightly different angles of view in order to emulate, in the display, the slightly different views that are seen by humans. Examples of such a stereo camera include the Kodak Stereo Realist camera. An example of a simultaneous two image capture lens camera (a non-stereo application) is detailed in U.S. Pat. No. 2,921,509.

More recently, there have been various cameras introduced that feature multiple images captured, purposefully in a non-simultaneous manner, through multiple lenses. These systems, such as U.S. Pat. No. 5,424,792, are designed to produce a temporal sequence of events representation of a scene, frequently being using to capture various time segments of a motion action.

With both of the above-mentioned systems featuring multiple images captured through multiple lenses, combining images to produce improved performance characteristics is difficult owing to the fact that these images are captured through different lenses that have a slightly different view of the scene. The images arc not fully identical and therefore, in general, can not be optically combined without errors. Indeed it is these very view differences that provide the depth information required to render the three dimensional display for the above-mentioned stereo camera.

Combining images to produce improved performance characteristics is also well known. The above-mention technicolor process requires image combination to process a color image from three black and white color separation images. Furthermore, it is well known that multiple records of the same scene can be combined to produce an images with improved performance characteristics. An example of this is the combination of two photographs of the same scene which are sequentially optically printed on to the same projected area of photographic paper. As the scene information is correlated and the noise of photographic grain is not correlated between the two images, the resulting combined image from this sequential optical printing process is one with reduced photographic noise or grain. In general, the noise can be reduced, using this method, by a factor of the square root of the number of same scene images sequentially printed on to the same projected area of photographic paper.

Most recently a system has been described, Kokai Patent Application No. HEI 7[1995]-336590, wherein a plurality of images have been formed onto a single frame of photographic film. By making many smaller images, it is possible to reduce the focal length of the lens and therefore provide a thinner camera. Reducing the lens focal length to reduce both image and camera size is featured in Kodak Disc film cameras and subminiature cameras, such as those introduced by Minox Corporation in the late 1930's. The above mentioned Kokai discloses a camera wherein multiple images are "almost simultaneously exposed on film." It further discloses both the digital and optical combination of these multiple images to produce an image with improved performance characteristics. However, as these images are captured through multiple lenses, each pointing to the scene, these images will not have recorded the same view of the scene. The differences amongst these multiple images are particularly apparent with scenes that feature objects at different relative distances from the camera. As noted above, these differences, also known as parallax errors, provide the depth information required to render the three dimensional display for the above-mentioned stereo camera. In addition, almost simultaneously exposing images on film will, unfortunately, yield additional differences owing to scene object movement amongst the multiple images. Another problem with non-simultaneous exposure is that given its very short time duration, a single electronic strobe flash cannot be used to illuminate the scene. Therefore, in the above-mentioned teaching of optical printing of images from such a multiple lens camera, improved performance only results when the scene objects were at the same relative distant point from the camera and were not in motion.

Through improved camera design it is possible to overcome one of the above mentioned problems. It is well known that it is possible to simultaneously capture multiple images through multiple lenses each pointing to the scene and producing a separate record of the scene. This can be achieved, for example, by utilizing a multiple lens camera, such as that disclosed in U.S. Pat. No. 5,477,291 with a multiple lens shuttering means, such as that disclosed in U.S. Pat. No. 5,001,504. The above referenced two lens camera, U.S. Pat. No. 2,921,509, also features simultaneous multiple lens scene capture.

The above-mentioned parallax problem resulting from having simultaneously captured multiple images formed from multiple lenses, each pointing to the scene, remains a problem, particularly for scenes where the scene objects are not at the same distance from the camera. The above-mentioned Kokai teaches a method to allow combination of some of the multiple images in order to produce a digital image with improved performance characteristics. The method disclosed is one wherein the multiple images of the scene are selected (based on analyzing the digitized data) and digitally combined to produce a digital image with improved performance characteristics. In order to address the problem resulting from parallax, they further teach averaging (a form of combining) "after microimages that have a level of correlation that is below a reference level have been extracted." A problem with this method of combination is that where the scene objects are at different distances from the camera, the resulting parallax errors can result in many or even all of the additional microimages, available for combination, being extracted and not utilized, therefore leaving the resulting "reaveraged" (combined) image having little or even no improved performance characteristics.

SUMMARY OF THE INVENTION

It is an object of the present invention to overcome the above mentioned problems and provide digital images with improved performance characteristics, by a method comprising the steps of:

a) producing at least two photographic images of a scene;

b) digitizing the at least two photographic images of the scene; and c) combining and processing the at least two digitized photographic images of the scene to produce a combined digital image of a scene with improved performance characteristics.

ADVANTAGES

The present invention overcomes the above-mentioned problems associated with photographic film capture of scenes. By capturing at least two photographic images of a scene and combining essentially the whole of all of these images, it is possible to achieve improved performance characteristics, such as reduced noise, improved sharpness, that result from image combination. In addition, improved characteristics can be obtained by capturing the at least two photographic film images through a corresponding number of separate lenses (each pointing at the scene), thus overcoming the above-mentioned problems that can result when beam splitter optics are employed.

DETAILED DESCRIPTION OF THE DRAWINGS

Figure 3:
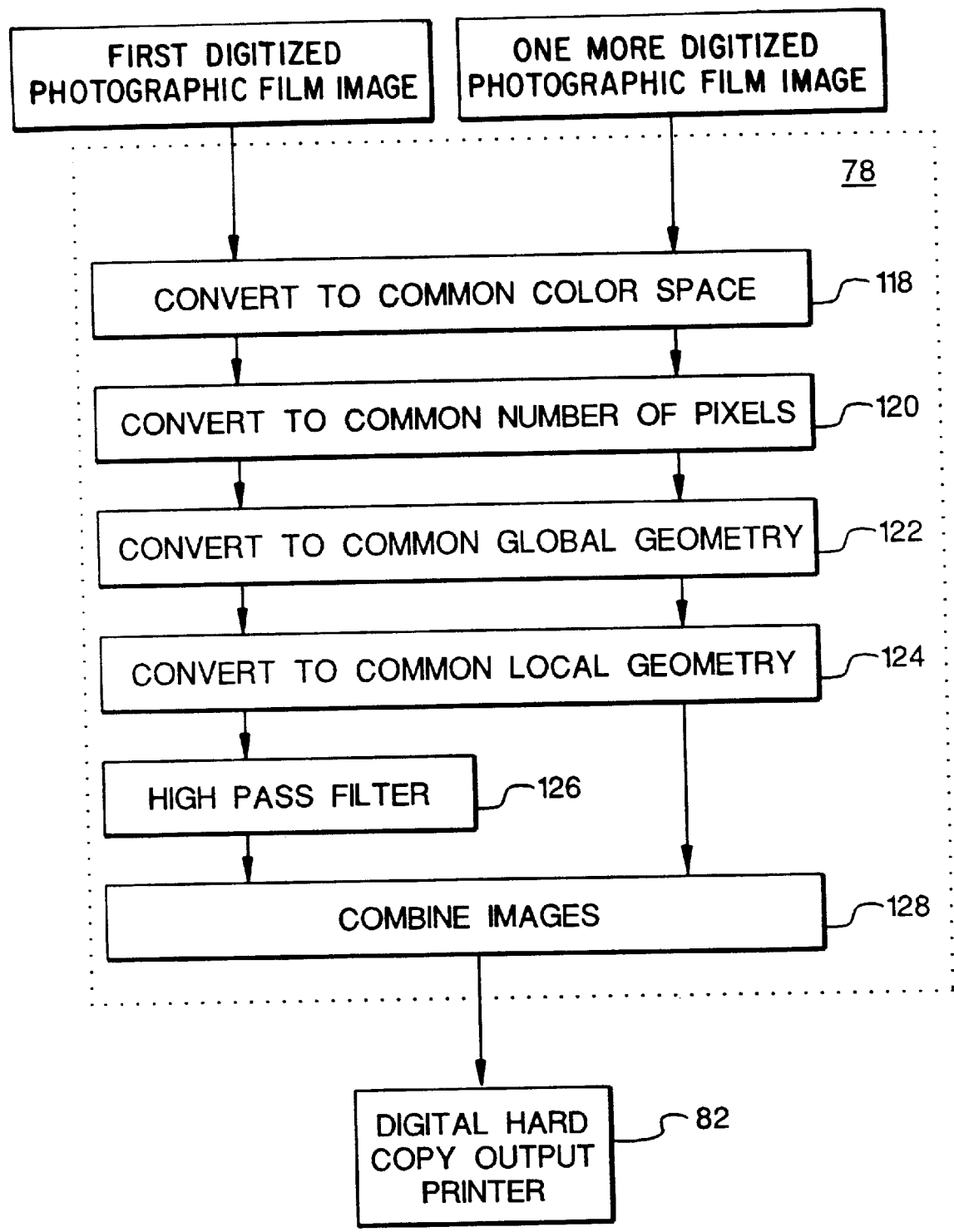

FIG. 2 is a block diagram showing a film scanner for scanning and digitizing the at least two photographic film images and for applying such digital signals to a central processing unit used to process images in accordance with the present invention; and FIG. 3 is a flow chart showing, in block diagram form, the steps needed for the combining and image processing to produce the digital image with improved performance characteristics.

DETAILED DESCRIPTION OF THE INVENTION

By the use of the term dual lens camera, is meant that there are at least two separate images formed with their own unique, non-optically linked lens systems. For clarity, much of the following description details only examples wherein two images are captured and combined; however, it will be evident to those skilled in the art that greater than two images could be captured and combined, as taught below, to provide digital images with improved performance characteristics.

Figure 1A:
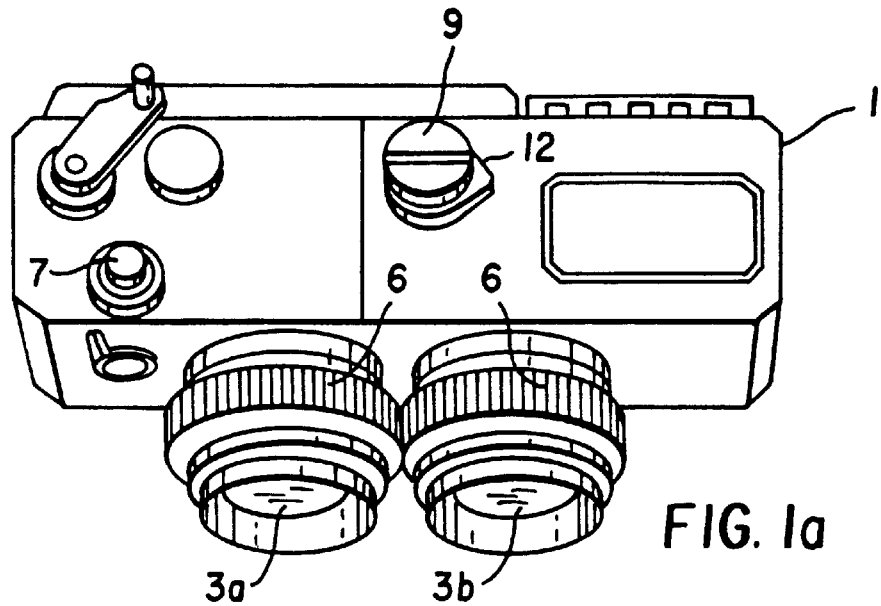
FIG. 1a is a perspective view of a dual lens camera in accordance with the present invention.

Turning to FIG. 1a, there is shown a dual lens photographic film camera having a main camera body 1; imaging lenses 3a and 3b; focusing mechanisms 6; a shutter switch including a self-return push-button switch 7; and a shutter speed dial 9. These components are the same as in a standard, single lens, photographic film camera.

Turning now to FIG. 2, a block diagram is shown having a film scanner 74 for digitizing images from a photographic film 76 produced by the camera main camera body 1. An example of a commercially available film scanner is RFS2035 film scanner manufactured by the Eastman Kodak Company. The film scanner 74 produces digital images of photographic images and delivers them to a central processing unit 78. The photographic film can be either a negative or a positive film. In addition, there are means (not shown) that allow all of the photographic images corresponding to a particular scene to be so identified after the scanning process. After the computer has processed the images in accordance with present invention, it produces output signals to a digital hard copy output printer 82, or alternatively displays the processed images on a cathode ray tube (CRT) not shown or utilizes these processed images in other subsequent steps (not shown), such as image transmission, alternate digital storage, or the like. Digital hard copy output printers, for example ink jet printers and thermal printers, are well known in the art. Also shown is digital image data storage device and media 80, such as magnetic discs (floppy disc) or magnetic tapes; optical storage media such as optical discs, optical tape, or machine readable barcode; solid state devices such as random access memory (RAM) or read only memory (ROM).

Turning now to FIG. 3 which is a block diagram showing the steps for producing a combined digital image having improved characteristics. This block diagram illustrates the method in terms of the two digital images being applied to the central processing unit 78. Although the algorithm is shown in terms of processing and combing two digitized photographic images, it will be evident to those skilled in the art that greater than two images could be captured, digitized, and combined, as taught below, to provide digital images with improved performance characteristics. Although this algorithm is embodied in the central processing unit 78, it will be well understood that the algorithm can be stored on a computer program product such as, for example, magnetic storage media, such as magnetic discs (floppy disc) or magnetic tapes; optical storage media such as optical discs, optical tape, or machine readable barcode; solid state devices such as random access memory (RAM) or read only memory (ROM).

The first step is to convert a first digitized photographic image and the at least one more digitized photographic images to a common color space. Though it is likely that these images were formed on the same piece and type of film, in general, they need not be formed on the same piece and type of film. In the case of more than one different film types being used, then the more than one photographic films need not have the same spectral sensitivities, possibly with the color information being apportioned differently among the more than one photographic films. The first digitized photographic image and the at least one more digitized photographic images should be transformed into a common color space with a common tone-scale, by means of color matrices and look-up tables (see, for example, W. K. Pratt, Digital Image Processing, pp 50–93, Wiley Interscience 1978), or by means of 3-D LUTs, techniques which are well known to those skilled in the art.

In block 120 the number of pixels in each of color converted images must be substantially matched in number of pixels. In other words, there should be a common number of pixels. It will be understood that the first digitized photographic image and the at least one more digitized photographic images of the scene need not have the same number of pixels, and in this case, the digitized photographic film images with lower spatial resolution (number of pixels) than the digitized photographic film image with the highest spatial resolution are upsampled by the method of, for example, bi-cubic interpolation to match the number of pixels of the digitized photographic image with the higher number of pixels. Other types of interpolation techniques can also be used to upsample digitized images, such as spatial function fitting, convolution, and Fourier domain filtering. These are well known in the art, and described, for example, in W. K. Pratt, pp 113–116.

In block 122, corrections are now made to the possibly color and pixel number converted digitized photographic images to correct for any difference in their global geometry, that is any geometrical transformation which, when applied to every pixel in one image, enables its geometry to be substantially mapped onto the geometry of another. Examples of such transformations are translation, rotation, scaling, aspect ratio, and the geometrical differences between the lens systems that are used for the at least two photographic film images. It will be understood this correction need be applied to all but one of the digitized photographic images to enable them to be mapped onto the one of the digitized photographic images that is not to be corrected for geometry (the default image). Since there may be some slight loss in image quality, sharpness in particular, associated with the application of this correction, the correction would normally be applied to the digitized photographic images which originally had fewer pixels at block 120. Without loss of meaning or clarity, this default image can also be the above-mentioned first digitized photographic image.

The correction will typically involve three steps which are described in terms of correcting one, of the digitized photographic images to be corrected, to the default digitized photographic image.

First is the generation of a set of displacement vectors, typically with sub-pixel accuracy, which characterize a local x,y displacement between each of the digitized photographic images to be geometrically corrected (non-default images) and the one digitized photographic image (the default image) chosen not to be corrected. A variety of techniques may be suitable, including block matching, and the method of differentials, both well known in the art (Image Processing, edited by D. Pearson, Chapter 3, "Motion and Motion Estimation," G. Thomas, pp 40–57, McGraw-Hill, 1991), but the preferred technique for this application is phase correlation. For a more complete disclosure of phase correlation techniques, see Pearson ibid and commonly assigned U.S. patent application Ser. No. 08/334,985, filed Nov. 7, 1994, the disclosure which is incorporated by reference herein. Phase correlation provides a method to generate displacement vectors which is robust in the presence of noise and brightness changes in the records of the scene.

The second step is the interpretation of that set of displacement vectors as a generalized geometrical transformation. Three commonly occurring transformations are described here, translation, magnification (zoom) and rotation in the plane of the image, but it will be understood that a similar process can be used to interpret all geometrical transformations of rigid bodies. In the case of translation, the transformation is defined, simply, as that x,y displacement which occurs most frequently in the set of displacement vectors. Otherwise, if two independent translation vectors are available from the vector set which map positions $(x_1, y_1)$ and $(x_2, y_2)$ in one image onto $(x_1', y_1')$ and $(x_2', y_2')$ respectively in the second image, then the following transformation may be defined:

Magnification, by a factor m (m≠1), about an origin at (a, b), is defined as $$\begin{bmatrix} m & 0 \\ 0 & m \end{bmatrix} \begin{bmatrix} x_i - a \\ y_i - b \end{bmatrix} + \begin{bmatrix} a \\ b \end{bmatrix} = \begin{bmatrix} x_i' \\ y_i' \end{bmatrix}$$

Hence, substituting the pair of translation vectors and rearranging yields $$m = \frac{x_2' - x_1'}{x_2 - x_1} \qquad a = \frac{x_2' - mx_2}{(1 - m)} \qquad b = \frac{y_2' - my_2}{(1 - m)}$$

The generalized equation for a rotation in the x,y plane about a center at (a, b) through an angle φ is $$\begin{bmatrix} \cos\phi & -\sin\phi \\ \sin\phi & \sin\phi \end{bmatrix} \begin{bmatrix} x - a \\ y - b \end{bmatrix} + \begin{bmatrix} a \\ b \end{bmatrix} = \begin{bmatrix} x' \\ y' \end{bmatrix}$$

which can be solved in a similar fashion by substituting in the translation vectors to yield a, b, φ, and so on for the other transformations.

The third step is the geometrical transformation of the non-default image to be geometrically corrected according to the parameters calculated and the transformation equations given in step 2. Typically, this is achieved using phase-shifting spatial interpolation, similar to the interpolation techniques referenced above, or of the type described in U.S. patent application Ser. No. 08/641,709, entitled "Digital Signal Processing for Implementation of Continuous Zoom With Sub-Pixel Accuracy", assigned to K. R. Hailey and J. C. Loveridge.

The above three steps are repeated for each of the at least one digitized photographic images that are not the default image. In the simplest implementation of this algorithm, these images are now combined by, for example, a numerical or geometric average on a pixel-wise basis, as shown in block 128.

However, frequently, local areas in the above mentioned simple combination suffer from poor quality resulting from, for example, differences in the local geometry among the images. A simple solution to this problem is to detect these local areas, and to change the way in which the images are combined in these local areas. Specifically, where the difference between the default image and one of the digitized photographic images (that has been geometrically corrected above), measured at each pixel location, is within a specified tolerance (depending on the inherent noise characteristics of the photographic film and subsequent scanning and digitization steps), the pixel values of the geometrically corrected digitized photographic image being evaluated are selected for eventual (after repeating this process for all of the digitized photographic images to be corrected) pixel-wise averaged with the default image. This results in a varying number (on a pixel-wise basis) of images being averaged at any pixel location.

An approach to provide improved image quality in local areas where the above mentioned tolerance is exceeded is to convert each of the non-default digitized photographic images to a common local geometry, as shown in block 124.

The measurement of these differences in local geometry is achieved by techniques similar to those used for the measurement of global displacements, and involves the assignment of a displacement vector, obtained, for example by the phase correlation technique, to each pixel in the image to be corrected. The resultant array of assigned vectors, which maps the values of each pixel in one of the non-default digitized photographic images onto the corresponding pixel positions in the default image, is generally referred to as a vector field. The method is well known and described, for example, in Image Processing, edited by D. Pearson, Chapter 3, "Motion and Motion Estimation," G. Thomas, pp 53–54, McGraw-Hill, 1991. In a repetitive process, each of the non-default images is areas for eventual averaging, pixel-by-pixel, the same location pixel values. It will be understood to those skilled in the art that although the above the description relates to the use of the vector field to correct for differences in local geometry between two images which have already been converted to a common global geometry, a vector field can be generated which can be used to measure and correct for differences in both the global and local geometries simultaneously. After all of the non-default images have been processed and selected as indicated above, local areas affected by the above-described local processing are combined (e.g. averaged) with the default image to provide a digital image with further improved performance characteristics.

Figure 1B:
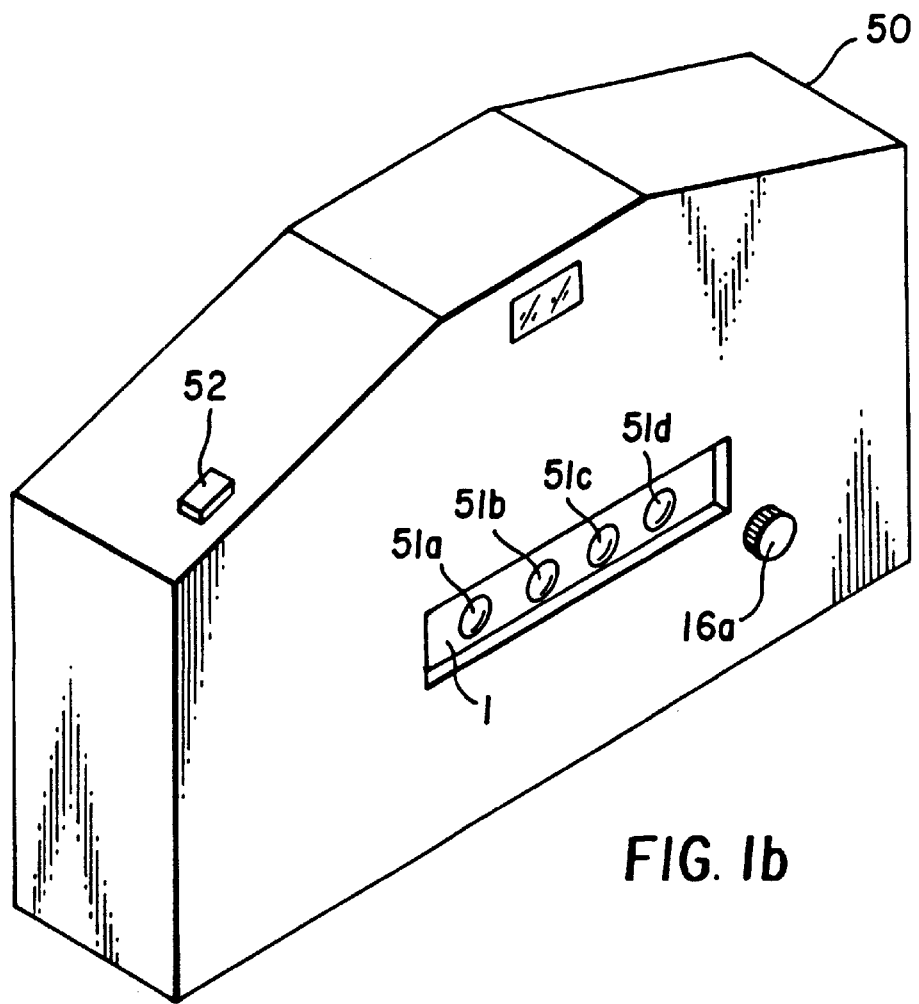
FIGS. 1b and 1c are perspective views of multiple lens cameras with four and eight lenses, respectively.
Figure 1C:
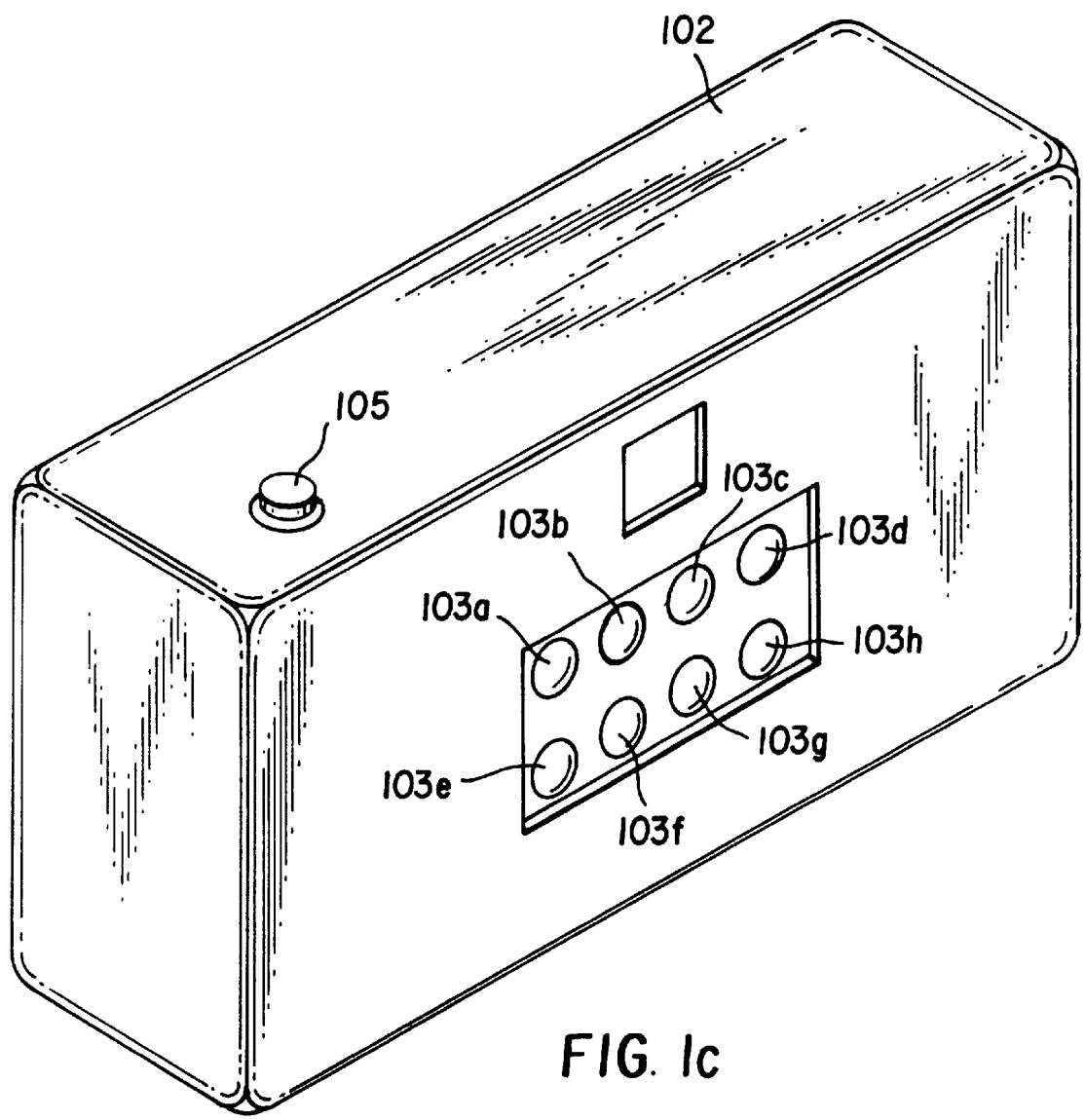

It will be further appreciated that embodiment described above can be varied and modified to greater than two lens, two photographic film image systems wherein all the greater than two lens, two photographic film image systems are used to simultaneously capture light information from the same scene. FIG. 1*b* shows a multi-lens camera with main body 50, four imaging lenses 51*a*, 51*b*, 51*c* and 51*d*, shutter switch 52 and focusing mechanism 16*a*. Similarly, FIG. 1*c* shows a multi-lens camera with main body 102, eight imaging lenses 103*a*–*h*, and shutter switch 105. As more than one representation of the scene is captured, it is possible to select scene exposure conditions in a way that provides for improving various characteristics.

One example arises if the at least two photographic film images did not capture the scene with the same lens focus conditions. Most scenes typically have scene objects at different distances from the camera, and therefore it is often the case, particularly with large apertures (small lens f-numbers), that only part of the scene is in focus. By utilizing image combination as described above, where the digitized photographic image with the best signal to noise is selected on a local basis, a combined image is produced in which more scene objects are sharper than in any one of the input images. In this case, the "sharpest" of the images is defined as whichever image has the highest local signal to noise ratio, as determined, for example, by comparing the magnitude of the high-pass filtered image to the a priori noise level for the corresponding image capture means as measured over the same band of spatial frequencies, for each of the images. Alternatively, it is possible to divide each of the digitized photographic film images, after applying the appropriate color and common global and local geometric conversions, into high and low frequency components by means of high-pass and low-pass filters. The low frequency component components of the images are averaged and the high frequency component of the image with the best signal to noise (as defined above) is chosen on a pixel-wise basis to represent the high frequency component of the processed and combined digital image with improved performance characteristics.

A second example occurs when the photographic images did not capture the scene with the same depth of field. The depth of field of an image capture system is a function of both lens focal length and aperture (f-number). It can be that the size of the image is not the same for two or more of the photographic images. In this case the smallest photographic film image was formed with shorter focal length lens (for the same angle of view of the scene) and, therefore, has the greatest the depth of field for a given lens f-number. An improved performance digital image can be achieved which is similar to that obtained when the images are captured at different focus positions; this time the difference in local sharpness (improved signal-to-noise) having resulted from capture with different depth cf field (or combination of depth of field and focus position). This variation can be particularly useful in situations where large size lens apertures are used, for example, in cases of low scene illumination or when very short exposure times are required, e.g., for capturing fast moving action without image blur.

A third example occurs when the photographic images were not subjected to the same exposure (integral of light intensity and exposure time) conditions thus rendering, in the case of the same film type being used for all of the exposures, images with different overall density, noise, and other film performance parameter conditions. One way to achieve this exposure difference would be to use different lens f-numbers with same size images (for the same angle of view of the scene) being formed on the film. In this case, the above-described scene object local sharpness technique could be applied. In addition, there may be cases, such as low light exposures, or a scene with a large brightness range of scene objects (dynamic range) and film with low dynamic range recording capability. A selection and combination strategy based of local evaluation and selection based on signal to noise, similar to that described above, may be again employed to produce a combined digital image with improved performance characteristics.

Further improvement in image performance can be achieved by utilizing alternate types of image combinations. For example, as described earlier, color separations captured on B&W film can be used to reproduce a full color image. Image permanence, photo processing and film manufacturing ease are advantages of B&W film compared to color film; however, no color discrimination is possible with the simple use B&W photographic films. One method to overcome this limitation is to utilize simultaneous multiple lens multiple image capture to acquire the information needed to reproduce a full color by having three or more of each of the multiple lenses spectrally filtered to one of at least three color types (e.g. red, green and blue; white, yellow, and green; or cyan, yellow, green and white). By utilizing the above described global and local combination techniques to combine the at least three images, a full color image can be reproduced. In addition, by utilizing greater than three spectrally filtered and captured images, it is possible to provide further improved color reproduction by being able to better estimate the original spectral power distribution of scene objects than is possible with only three color capture.

Yet another improvement can be achieved if images are formed simultaneously on two different photographic films. For example, photographic images on a full color film and a B&W film could be captured. The B&W photographic film image could provide improved detail and or low light sensitivity while, for example, color information, possibly of lower spatial frequency information content, is extracted from the color photographic film. Alternatively, two different color films, for example one with low and one with high light-sensitivity can be used. In this case image combination provides improved performance by combining or selecting scene objects based on their relative lighting in the scene.

The invention has been described in detail with particular reference to a certain preferred embodiment thereof, but it will be understood that variations, modifications, and combinations of the above methods can be effected within the spirit and scope of the invention.

| Parts List | |
|---|---|
| 1 | main camera body |
| 3a | imaging lens |
| 3b | imaging lens |
| 6 | focusing mechanisms |
| 7 | shutter switch |
| 9 | shutter speed dial |
| 16a | focusing mechanism |
| 50 | main body |
| 51a | imaging lens |
| 51b | imaging lens |
| 51c | imaging lens |
| 51d | imaging lens |
| 52 | shutter switch |
| 74 | film scanner |
| 76 | photographic film |
| 78 | central processing unit |
| 80 | digital image data storage device and media |
| 82 | digital hard copy output printer |
| 102 | main body |

| Parts List -continued | |
|---|---|
| 103a | imaging lens |
| 103b | imaging lens |
| 103c | imaging lens |
| 103d | imaging lens |
| 103e | imaging lens |
| 103f | imaging lens |
| 103g | imaging lens |
| 103h | imaging lens |
| 105 | shutter switch |
| 120 | block |
| 122 | block |
| 124 | block |
| 128 | block |

We claim:

1. A method of producing a digital image with improved performance characteristics, comprising the steps of:

a) capturing a first photographic film image of a scene through a first lens of a camera;

b) capturing at least one or more photographic film images of the same scene which are captured simultaneously with the first photographic image;

c) digitizing the first and the at least one or more photographic film images of a scene; and d) combining and processing the digitized first photographic film image with the at least one or more digitized photographic film images to produce another digital image with improved spatial resolution and reduced noise including:
      (i) converting images to a common color space;
      (ii) converting images to a common number of pixels;
      (iii) converting to a common global geometry;
      (iv) globally aligning the digitized first and at least one more photographic film images, then, when there is misalignment in local areas, measuring and correcting misalignment in locally misaligned areas of the digitized first and at least one more photographic film images; and
      (v) combining and processing the converted digitized first and at least one more photographic film images to produce another digital image with improved performance characteristics.

2. The method of claim 1 wherein at misaligned local areas, selected portions of the digitized photographic film images are further processed.

3. The method of claim 1 wherein the combining and processing step includes low-pass and high-pass filtering of the digitized first and the at least one more digitized photographic film images, and combining the images by first averaging the low-pass filtered images and then adding the high-pass filtered images containing more information.

4. The method of claim 1 wherein the combining and processing step includes high-pass filtering of the digitized first and at least one more digitized photographic film images containing more information at high spatial frequencies, and combining the images by adding these high-pass filtered images to the at least one image containing less information at high spatial frequencies.

* * * * *